C. W. DOBELIN.
FASTENING DEVICE FOR CONTAINER COVERS.
APPLICATION FILED MAR. 3, 1920.
1,365,466.
Patented Jan. 11, 1921.
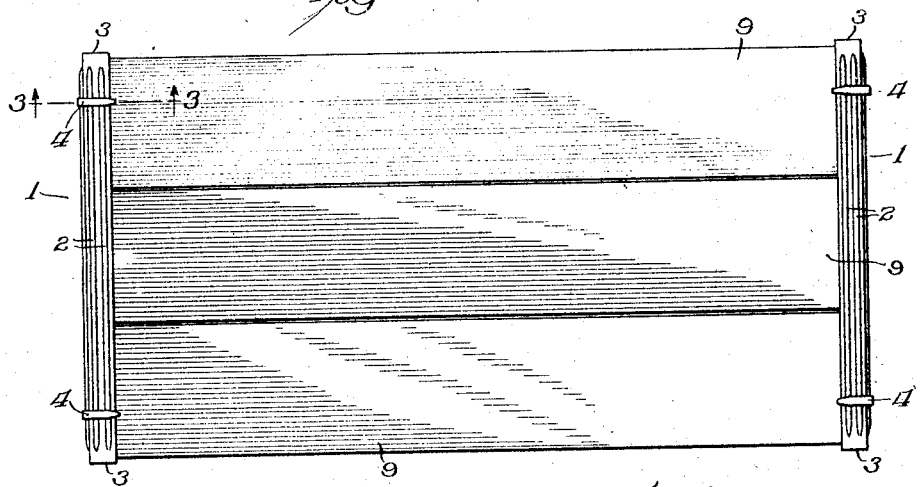
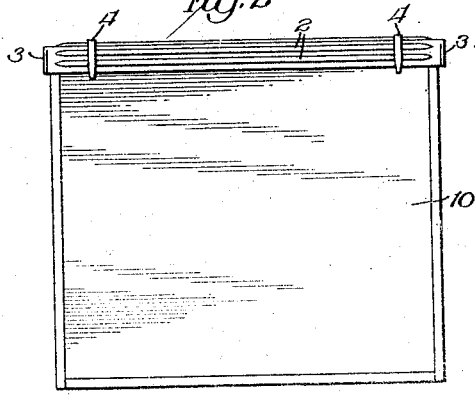
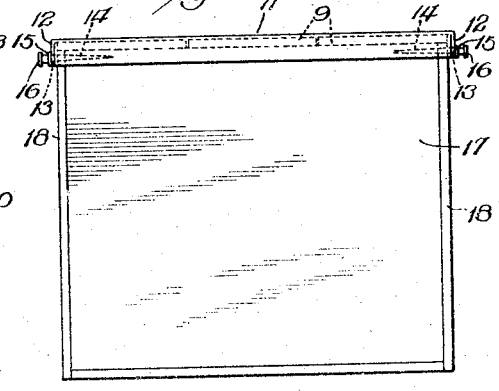
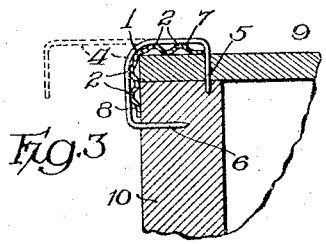
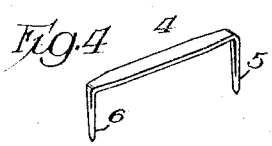
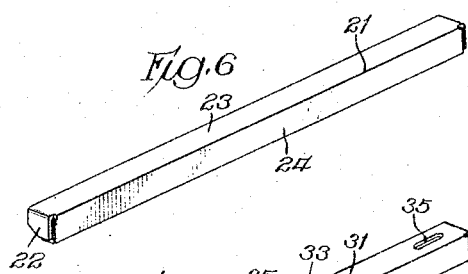
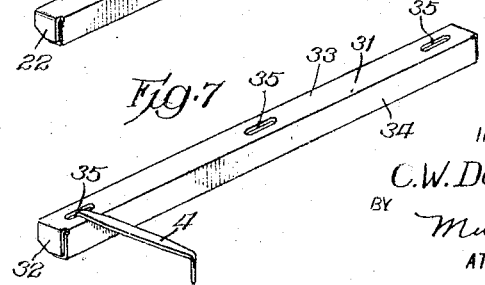
INVENTOR
C. W. Dobelin
BY
Munn &Co
ATTORNEYS

UNITED STATES PATENT OFFICE.

CHARLES W. DOBELIN, OF MADISON, WISCONSIN.

FASTENING DEVICE FOR CONTAINER-COVERS.

1,365,466.  Specification of Letters Patent.  Patented Jan. 11, 1921.

Application filed March 3, 1920. Serial No. 363,045.

*To all whom it may concern:*

Be it known that I, CHARLES W. DOBELIN, a citizen of the United States, and a resident of Madison, in the county of Dane and State of Wisconsin, have invented a new and useful Improvement in Fastening Devices for Container-Covers, of which the following is a full, clear, and exact description.

My invention relates to improvements in fastening devices for container covers, and it consists in the combinations, constructions, and arrangements herein described and claimed.

An object of my invention is to provide a fastening device for container covers which can be detachably applied to secure a cover in position to close a container without the necessity of nailing the cover to the container, whereby a cover can be used repeatedly.

A further object of my invention is to provide a device of the type described that conforms to the outline of a portion of a container, thus permitting stacking of the containers to which the device has been applied.

A further object of my invention is to provide a device of the type described that can be quickly attached in operative position and detached therefrom without injury to the container and container cover to which applied.

A further object of my invention is to provide a device of the type described that is simple in construction and operation and which is thoroughly practical commercially.

Other objects and advantages will appear in the following specification, and the novel features of the invention will be particularly pointed out in the appended claims.

My invention is illustrated in the accompanying drawings, forming part of this application, in which—

Figure 1 is a top plan view of a container showing the device applied,

Fig. 2 is an end view of the same,

Fig. 3 is a section along the line 3—3 of Fig. 1,

Fig. 4 is a perspective view of a portion of the device,

Fig. 5 is an end view of a container showing a modified form of the device applied, Fig. 6 is a perspective view and another modified form of the device, Fig. 7 is a perspective view of still another modified form of the device.

Referring to Fig. 1, it will be noted that I provide a pair of angle members 1 which are identical in construction throughout. For the sake of securing the combination of lightness and strength, the angle members 1 are corrugated at 2. The angle members 1 have legs or sides 7 and 8 which are connected at their ends by integral extensions 3 to the leg or side 7. The extensions 3 are bent at right angles to the leg 7.

It will be noted that the angle members 1 are placed in position to engage the juncture of the end edges of a cover 9 of a container which has ends 10. The angle members 1 are clamped in position by means of a plurality of staples 4 which have prongs 5 and 6, as shown in Fig. 4 of the accompanying drawings. The prong 5 is driven into the cover 9 and the staple is then bent around the angle member 1 and the prong 6 is driven into the end 10. It is only necessary to use two of the staples 4 at each end of the container in the manner described in order to securely clamp the cover 9 in position to close the container. Referring now to Fig. 5, I have shown a modified form of the device. I provide an angle member 11 having end portions 12 in which holes 13 are provided. The angle member 11 is placed in position on a container having an end 17 and sides 18. A brad 14 is driven through the holes 13 into the side 18 of the container to maintain the angle member 11 in operative position. The brad 14 has a head 15 and a projecting extension 16 by means of which the brad 14 may be removed without injury to the angle member 11 or to the container to which applied. It will be noted that a cover 19 is securely held in position by the angle member 11.

Referring now to Fig. 6, I have shown another modified form of the device in which I provide an angle member 21 which has legs 23 and 24 and ends 22. The form of the device illustrated in Fig 6 is maintained in position by the staples 4 in the manner hereinbefore described.

Referring now to Fig. 7, I show still another modified form of the device. I provide an angle member 31 having legs 33 and 34 and ends 32. A plurality of holes 35 are provided at spaced distances apart through the leg 33. The angle member 31 is placed in position at the juncture of a cover and end edge of a container in the manner described. The leg 33 will then overlie a portion of the cover while the leg 34 will be in position against the end of the container. The prong 5 of the staple 4 is inserted through the hole 35 and driven into the cover. The staple 4 is driven into the end of the container, thus maintaining the angle member 31 in position. It will be understood that the ends 32 fit closely against the sides of the container to prevent lateral motion of the angle member 31 with respect to the container.

From the foregoing description of the various parts of the device, the operation thereof may be readily understood. The device may be quickly applied and removed without injury to the container or cover, and consequently a container and its cover can be used repeatedly. When a cover is nailed to a container in accordance with the general practice, it is very often split and rendered unfit for further service when removed. The use of my improved fastening device will therefore effect a great economy. One of the advantages of the device is that it permits the stacking of containers to which it is operatively applied.

It is obvious that one end of a cover for a container, to which my improved fastening device has been applied, may be released and that the released end may be then swung upwardly and the contents of the container removed without the necessity of releasing the other end of the cover.

I claim:

1. A device for fastening a lid or cover in position on a crate, said device comprising a pair of separate angular members, each adapted to embrace the marginal portions of the lid and an end of the crate along the juncture of said lid and end, and a plurality of staples bent transversely around said angular members and having their ends driven into the lid and ends of the crate to removably secure said angular members in position.

2. A device for fastening a lid in position on a crate, said device comprising a pair of separate right angular members closed at their ends, each of said members being adapted to have its sides engage the marginal portions of the lid and an end adjacent the connection thereof, and to have its ends engage the adjacent corner portions of the sides of the crate to prevent longitudinal movement of said angular member relative to the crate, and a plurality of staples bent transversely across said angular member and having their ends driven into the lid and the ends of said crate.

CHARLES W. DOBELIN.